United States Patent [19]

Mandel

[11] Patent Number: 4,955,965
[45] Date of Patent: Sep. 11, 1990

[54] POSITIVE DRIVE, PASSIVE, SHEET ROTATION DEVICE USING DIFFERENTIAL ROLL VELOCITIES

[75] Inventor: Barry P. Mandel, Fairport, N.Y.

[73] Assignee: Xerox Corporation, Stamford, Conn.

[21] Appl. No.: 280,078

[22] Filed: Dec. 5, 1988

[51] Int. Cl.⁵ ............................................. B65H 5/06
[52] U.S. Cl. ................................... 271/225; 271/184; 271/251
[58] Field of Search ............... 271/251, 225, 184, 185, 271/250

[56] References Cited

U.S. PATENT DOCUMENTS

| | | | |
|---|---|---|---|
| 3,175,824 | 3/1965 | Albosta | 271/251 |
| 3,758,104 | 9/1973 | Daily | 271/75 |
| 3,980,296 | 9/1976 | Craft et al. | 271/251 |
| 4,109,595 | 8/1978 | Ducol | 271/225 X |
| 4,155,440 | 5/1979 | Bogdanski et al. | 198/399 |
| 4,188,025 | 2/1980 | Gusfafson et al. | 271/314 |
| 4,236,626 | 12/1980 | Noe | 198/774 X |
| 4,270,655 | 6/1981 | Noe | 198/774 |
| 4,387,800 | 6/1983 | Noe | 198/774 X |
| 4,669,719 | 6/1987 | Fratangelo | 271/185 X |
| 4,830,356 | 5/1989 | Zoltner | 271/184 X |

FOREIGN PATENT DOCUMENTS

| | | | |
|---|---|---|---|
| 3443937 | 6/1986 | Fed. Rep. of Germany | 198/502.2 |
| 90344 | 6/1982 | Japan | 271/251 |
| 31844 | 2/1983 | Japan | 271/251 |
| 258036 | 12/1985 | Japan | 271/185 |
| 0235117 | 10/1987 | Japan | 198/502.2 |

OTHER PUBLICATIONS

IBM Technical Disclosure Bulletin, vol. 2 No. 3, p. 7, Oct. 1959, "Document Feed", E. M. Valehrach et al.

Primary Examiner—Richard A. Schacher
Attorney, Agent, or Firm—William A. Henry, II

[57] ABSTRACT

A device capable of rotating sheets 90° relative to an input orientation, utilizes a set of continuously driven rolls all turning with different surface velocities.

11 Claims, 2 Drawing Sheets

POSITIVE DRIVE, PASSIVE, SHEET ROTATION DEVICE USING DIFFERENTIAL ROLL VELOCITIES

This invention is directed to positioning sheets before they reach a sheet folding apparatus, and more particularly, to a sheet turning system used with such an apparatus.

In order to preform standard letter folds using a buckle folder, sheets must be fed to the folder short edge first. Since the output from most copiers and electronic printers is long edge first, some type of sheet turning mechanism is necessary if folding is to be done in an on-line, straight-line system. If a right angle sheet transport system is used, everything is turned, and it is no longer possible to use the same folder to fold A3 or other size sheets that are often already oriented short edge first.

Systems in the past have been able to rotate materials for different reasons by the use of costly, cumbersome and complicated mechanisms and devices. For example, U.S. Pat. No. 4,155,440 discloses a document handling device for turning a document such as a letter substantially 90° in its own plane, utilizing a plurality of pairs of rollers driven at different speeds. In U.S. Pat. No. 3,758,104 an apparatus for turning flat articles is shown comprising two wheeling disks, rotating at different speeds to turn the article. An apparatus for offset stacking two or more sets of sheets in U.S. Pat. No. 4,188,025 includes two rotatable sheet engagable rollers which form a sheet propelling nip. At least one of the rollers is selectively moveable between two positions so that in the first position the nip imparts a first velocity profile to sheets of the first set to move them seriatim to a first stacking position and in the second position the nip imparts a different velocity profile to sheets of the second set to move them seriatim to a second stacking position offset from the first stacking position. U.S. Pat. No. 3,980,296 shows an aligner apparatus in a transfer station of a reproduction machine that uses angled rollers to move a document from one reference edge to another. The heretofore mentioned sheet transport systems and others of the like do not appear to be adaptable to the rotation of sheets in copiers in some instances and in most instances are bulky, complicated and costly.

Accordingly, a sheet rotator is disclosed that is valuable for feeding into short edge feed finishers from long edge feed machines and includes a shaft with several turn rollers driven from it at different speeds. A sheet is rotated 90° and by the time rotation has been completed the sheet has been driven out of the turn rolls and is acquired by registration rolls.

The above-mentioned features and others of the invention, together with the manner of obtaining them, will best be understood by making reference to the following specification in conjunction with the accompanying drawings, wherein.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

For a general understanding of the features of the present invention, reference is had to the drawings.

The sheet turning apparatus of the present invention comprises a shaft with several rollers driven from it at different speeds. Turning of a sheet is accomplished by the different rollers being driven at different speeds. The sheet pivots about the rolls from the outside toward a registration edge until it has been turned 90 degrees. At that time, registration rolls drive the sheet against a registration edge and toward sheet transport nips.

Figure 1:
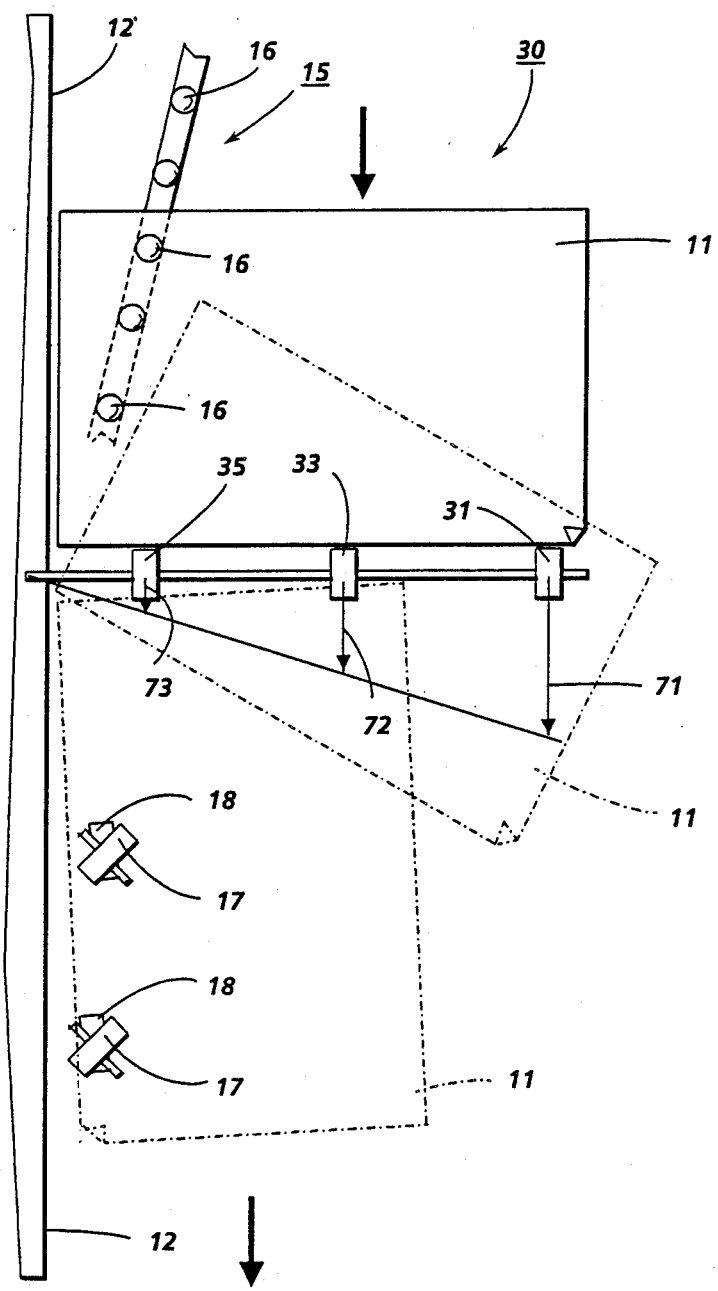
FIG. 1 is a schematic plan view showing an embodiment of the sheet turning and registration apparatus of the present invention.
Figure 2:
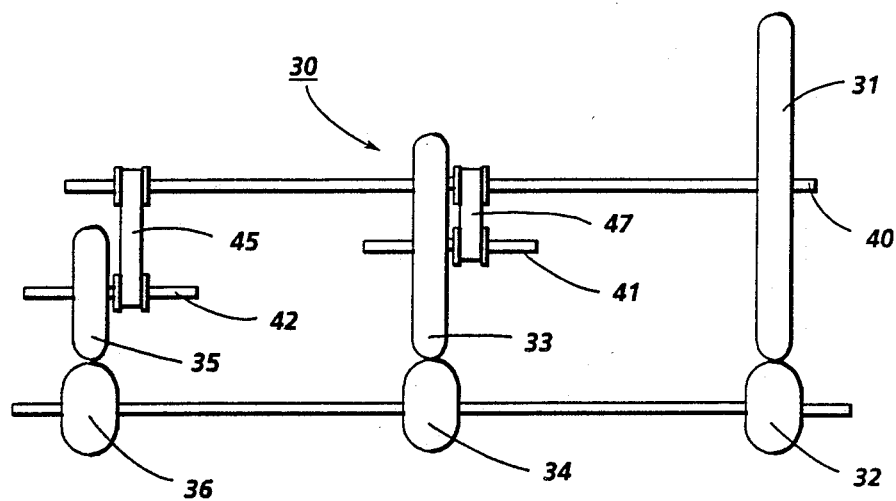
FIG. 2 is an end elevational view of the sheet turning and registration apparatus of FIG. 1.

With particular reference to FIGS. 1, and 2, a sheet 11 is conveyed long edge first within a printer apparatus and a under conventional side registration system such as, a ball-on-belt transport 15 that has freely rotatable balls 16 that rest on the drive belt structure due to gravity. The ball-on-belt transport 15 is positioned at an acute angle with respect to side registration edge 12 and due to sheet 11 being conveyed under the balls turning, it tends to direct the sheet toward registration edge 12. Once the sheet reaches the sheet turning apparatus 30 the sheet is rotated by the turning apparatus 90° relative to its input orientation. The turning apparatus utilizes a set of continuously driven crown rolls 31, 33, and 35 all turning at different speeds on drive shafts 40, 41, and 42, respectively. Crowned idler rolls 32, 34, and 36 form sheet manipulating nips with drive rolls 31, 33, and 35 that are each different in diameter. A pulley system 47 connects drive roll 33 to shaft 40 and pulley system 45 connects drive roll 35 to shaft 40. Since the drive rolls are of different diameters they are driven at different speeds as indicated by velocity vectors 71, 72, and 73 and as the sheet passes through the turn rolls it is rotated. The amount of rotation will depend on the location of the intersection point of the roll axes and a line drawn through the velocity vectors of the turn rolls. It is preferable to have a turning apparatus that rotates sheets slightly less than 90° to insure that sheets will never be driven into the registration edge. As a sheet completes its rotation, it is driven out of the turn rolls and captured by side registration cross roll nips 17, 18 and registered against side registration edge 12 now with its short edge as the lead edge and forwarded for further processing.

Figure 3:
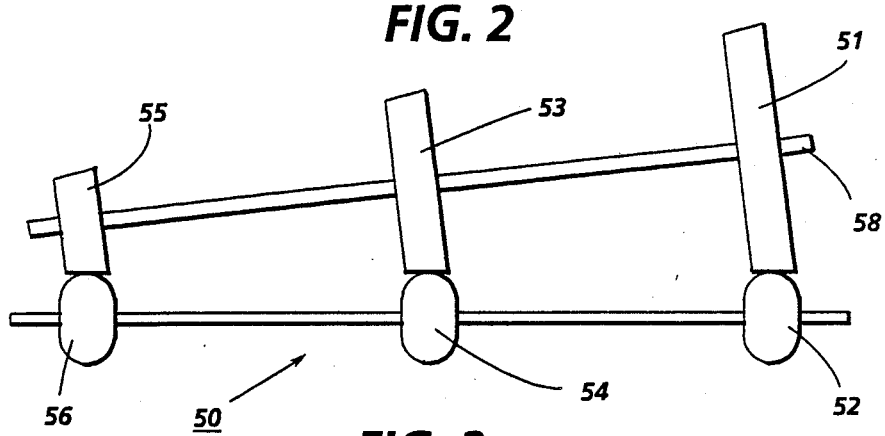
FIG. 3 is an elevational view of an alternative embodiment of the sheet turning device of the present invention employing conical shaped rolls of different sizes.

An alternative embodiment of the sheet turning apparatus of the present invention is shown in FIG. 3 and comprises a series of beveled edge drive rolls 51, 53 and 55 having different diameters and mounted on a common conventionally driven shaft 58. Mating idler crown rolls 52, 54 and 56 cooperate with drive rolls 51, 53 and 55, respectively, to form sheet turning nips. The different diameters of the beveled edge drive rolls cause a sheet in the nips to rotate from the outside edge approximately 90° and thereby change a long edge first fed sheet into a short edge first fed sheet or vice versa.

Figure 4:
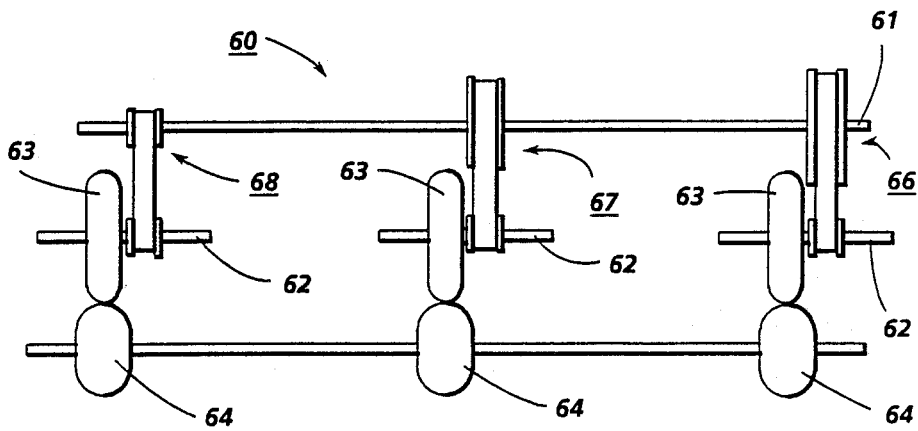
FIG. 4 is an elevational view of yet another alternative embodiment of the present invention showing differential drives for rollers of the same size.

Another alternative embodiment of the sheet turning apparatus of the present invention is shown in FIG. 4. A drive shaft 61 supports pulley 66, 67 and 68 that are drivingly connected to shaft 62 which support drive rolls 63. Crown idler rolls 64 mate with the drive rolls 63 to form nips there between. Pulleys 66, 67 and 68 drive rolls 63 at different speeds thereby serving to turn a sheet within the nips 90°.

It should now be apparent that a sheet turning device has been disclosed that is capable of rotating sheets 90° relative to their input orientation. This function is necessary to perform many "on-line" finishing operations. The device utilizes a set of continuously driving rolls all turning with different surface velocities. The velocity vectors are set so as to produce rotation of a sheet as it passes through nips formed between the driving rolls and cooperating idler rolls.

What is claimed is:

1. A sheet turning mechanism for turning sheets 90° and registering them against a registration member is adapted for use with a folder apparatus and characterized by at least two pairs of crowned roller nips constantly rotating at their respective speeds, and wherein said at least two crowned roller nip pairs are driven such that their surface velocities create a rotation of the sheets about the lead corner of the sheets adjacent to said registration member and completes a 90° rotation of the sheets before leaving said nips.

2. The sheet turning mechanism of claim 1, wherein said roller pairs comprise drive rollers and idler rollers and wherein said drive rollers are mounted on the same shaft.

3. The sheet turning mechanism of claim 2, wherein said same shaft is positioned at an acute angle with respect to a horizontal plane.

4. The sheet turning mechanism of claim 1, wherein each of said drive rollers is mounted on separate shafts.

5. The sheet turning mechanism of claim 1, wherein said roller pairs comprise drive rollers and idler rollers and wherein said drive rollers are mounted on the same shaft and driven at different speeds.

6. The sheet turning mechanism of claim 1, wherein said drive rollers are driven at constant different speeds.

7. A sheet turning mechanism for turning sheets 90° and registering them against a registration member is adapted for use with a folder apparatus and characterized by two or more pairs of roller nips constantly rotating at their respective speeds, said roller pairs comprise drive rollers and idler rollers and wherein said drive rollers are mounted on the same shaft and wherein each of said drive rollers includes a beveled sheet engaging surface, and wherein said two or more roller nip pairs are driven such that their surface velocities create a rotation of the sheets about the lead corner of the sheets adjacent to said registration member and completes a 90° rotation of the sheets before leaving said nips.

8. The sheet turning mechanism of claim 7, wherein each of said idler rollers includes a crowned sheet engaging surface.

9. A sheet turning mechanism for turning sheets 90° and registering them against a registration member is adapted for use with a folder apparatus and characterized by at least three pairs of crowned roller nips constantly rotating at their respective speeds, and wherein said at least three crowned roller nips pairs have one roller of each roll pair of different diameter from the rollers of the other pairs, and wherein said roller pairs comprise drive rollers and idler rollers and wherein said drive rollers are driven at different speeds such that their surface velocities create a rotation of the sheets about the lead corner of the sheets adjacent to said registration member and completes a 90° rotation of the sheets before leaving said nips.

10. The sheet turning mechanism of claim 9, said drive rollers are mounted on the same shaft.

11. A sheet turning mechanism having the capability of turning sheets 90° comprises at least three pairs of roller nips constantly rotating at their respective speeds, and wherein said at least three roller nips pairs have one roller of each roll pair of different diameter from the rollers of the other pairs and are adapted such that their surface velocities create a rotation of the sheets about the lead corner of the sheets adjacent to said registration member and completes a 90° rotation of the sheets before leaving said nips.

* * * * *